United States Patent
Buttin et al.

(10) Patent No.: US 7,499,378 B2
(45) Date of Patent: Mar. 3, 2009

(54) DEVICE FOR EMITTING SEISMIC VIBRATION WAVES

(75) Inventors: Pascal Buttin, Clarac (FR); Gilles Caradec, Castanet Tolosan (FR)

(73) Assignee: Sercel, Carquefou (FR)

(*) Notice: Subject to any disclaimer, the term of this patent is extended or adjusted under 35 U.S.C. 154(b) by 4 days.

(21) Appl. No.: 10/599,023

(22) PCT Filed: Mar. 18, 2005

(86) PCT No.: PCT/FR2005/000667

§ 371 (c)(1),
(2), (4) Date: Jul. 16, 2007

(87) PCT Pub. No.: WO2005/091016

PCT Pub. Date: Sep. 29, 2005

(65) Prior Publication Data

US 2007/0247970 A1 Oct. 25, 2007

(30) Foreign Application Priority Data

Mar. 18, 2004 (FR) .................................. 04 02794

(51) Int. Cl.
*G01V 1/02* (2006.01)
*G01V 1/143* (2006.01)

(52) U.S. Cl. .................. 367/189; 181/113; 181/114
(58) Field of Classification Search ................ 367/189; 181/113, 114, 121
See application file for complete search history.

(56) References Cited

U.S. PATENT DOCUMENTS 4,116,300 A * 9/1978 Stone .......................... 181/114
4,390,077 A 6/1983 Fulkerson (Continued)

FOREIGN PATENT DOCUMENTS

EP 0 281 253 9/1988

(Continued)

OTHER PUBLICATIONS

International Search Report for PCT Application No. PCT/FR2005/000667; Filed Mar. 18, 2005; Date of Completion Jul. 29, 2005; Date of Mailing Aug. 16, 2005.

*Primary Examiner*—Ian J Lobo
(74) *Attorney, Agent, or Firm*—Alston & Bird LLP

(57) ABSTRACT

The invention relates to a device for emitting seismic vibration waves mountable on a movable platform (100) comprising a vibration system for transmitting the waves into the ground and a system for supporting a device (200) on the ground, wherein the system for supporting on the ground is fixable to the movable platform (100) and transfers a charge to a ground-mounted vibration system in a ground support direction (1). Said ground-mounted vibration system is fixable to the system for supporting on the ground by compensation means (251, 252, 253) for compensating perpendicularity defects between the ground general plane and the around support direction (1). Said invention is characterised in that said compensation means comprises elongated elements which are exposed to tensile strength along the longitudinal axes thereof, respectively and rotatably mounted by each free end thereof around at least one axis of rotation which is substantially perpendicular to the ground support direction (1), wherein the axes of rotation of each elongated element are fixed to the vibration system and to the fixed part of the system for supporting on the ground.

4 Claims, 3 Drawing Sheets

U.S. PATENT DOCUMENTS

| | | | |
|---|---|---|---|
| 4,655,314 A | | 4/1987 | Airhart |
| 4,660,674 A | | 4/1987 | Airhart |
| 4,771,858 A | | 9/1988 | Goodloe |
| 4,967,870 A | * | 11/1990 | Airhart ........................ 181/121 |

FOREIGN PATENT DOCUMENTS

| | | |
|---|---|---|
| EP | 0 382 979 | 8/1990 |

\* cited by examiner

DEVICE FOR EMITTING SEISMIC VIBRATION WAVES

BACKGROUND OF THE INVENTION

The invention concerns a device employed to transmit seismic vibrations in order to obtain geophysical data on buried layers.

More particularly, the invention concerns such a device intended to be mounted on a mobile platform, such as a mobile vehicle of the truck and/or buggy type.

The active part of such a device is a vibration assembly with as its function to apply, to the ground, a variable force (of the sinusoidal type for example) of predetermined nominal value.

To this end, and referring to FIG. 1, the vibration assembly device 200 known from previous designs includes a vibrator part and a support plate 210 for coupling to the ground, with the support plate 210 used to transmit the vibrations generated by the vibrator through the ground. The vibrator part includes a reaction mass 270 and a drive piston 260, the piston 260 being used, when it is operated by a servo-valve, to guide the reaction mass 270 in a relative movement with respect to the support plate 210. The vibrator part is thus used to generate a seismic vibration wave and to transmit it into the ground.

In order to hold the vibrator part and the support plate 210 flat against the ground, a ground-hugging assembly is also included in the device 200 which is known from previous designs. This ground-hugging assembly is therefore fixed to the vibration assembly, and mounted to slide on the chassis 100 of the mobile platform serving as a firstly to place the vibration assembly on the ground and secondly to transfer the weight of the mobile platform onto the support plate 210, which thus applies a static pre-load in a direction along an axis 1. This axis 1 is parallel to the slide on the chassis 100, and is generally chosen to be perpendicular to the lower surface of the support plate 210, which is considered to be parallel to the general plane of the ground.

However, the ground on which such a device 200 is placed is never uniformly horizontal. Thus, the general plane of the ground may not be perpendicular to axis 1 and can therefore generate shear stresses in the device 200, in particular at the level of the vibration assembly coupled to the ground by means of the support plate 210. These shear stresses then tend to reduce the quality and the reliability of the device 200 if no compensation members are provided.

In order to attempt to get around these problems, referring to FIG. 2, the devices 200 of previous design include compensation members consisting of mechanical links between the vibration assembly and the ground-hugging assembly. These compensation members thus compensate for the perpendicularity anomalies of the ground in relation to the axis 1, by allowing an axial deviation 2 of the piston 260 in relation to the axis 1 of the ground hugging direction, of up to a solid angle a, and thus allowing the ground to be hugged in a consistent manner by the vibration assembly (with a maximum of contact between the vibration assembly and the ground), and thereby preserving sufficient pressure of the mobile platform on the vibration assembly, and minimising the shear stresses in the device 200.

These compensation members can also be used to isolate the ground hugging device, as well as the chassis of the mobile vehicle, from the vibrations emitted by the vibration device.

Typically, the compensation members located between the lower part of the vibration assembly and the ground-hugging assembly are composed of, or include, air cushions 252, thus allowing, pneumatically and asymmetrically in relation to the axis 1, an inclination of the vibration assembly in relation to the ground-hugging assembly, thus compensating for one part of the verticality error of the ground in relation to the axis 1 of the ground hugging direction.

The compensation members located between the upper part of the vibration assembly and the ground-hugging assembly are generally composed of air cushions 251, to compensate for part of the verticality error of the ground in relation to the axis 1 of the ground hugging direction, and of sliding skids 259 allowing a sliding motion of the vibration assembly on the ground-hugging assembly with the minimum of friction, thus compensating for at least one part of the ground perpendicularity error in relation to the axis 1 of the ground hugging direction.

Other compensation members for horizontal and/or vertical displacements can be provided, such as rubber horizontal and/or vertical skids and/or reaction bars positioned between the vibration assembly and the ground-hugging assembly.

In addition, the transfer of the weight from the mobile platform 100 to the vibration assembly via the ground-hugging assembly is accomplished in particular from above. In fact, forces transit via a lower distribution/synchronisation frame 230 (resting on the bottom cushions 252), via the sliding members 290 of the vibration assembly, and finally, via an upper distribution/synchronisation frame 248 which bears upon the sliding skids 259 by means of an intermediate structure 247. This upper distribution/synchronisation frame 248 is particularly costly and constitutes a complex element of the device 200 in relation to the other elements.

In addition, this upper distribution/synchronisation frame 248, the intermediate structure 247, and the sliding skids 259 are so many elements of the device 200 constituting a cumbersomeness, which hinders a good maintenance of the device 200.

BRIEF SUMMARY OF THE INVENTION

The invention attempts to overcome these problems by proposing a device for the transmission of seismic vibrations which is intended to be mounted on a mobile platform and includes:
 a vibration assembly to transmit the vibrations into the ground, and
 a ground-hugging assembly for the device,
 where the ground-hugging assembly is designed to be fixed to the mobile platform and to transfer the load from the latter, in ground hugging direction, onto the vibration assembly flattened against the ground, with the vibration assembly being fixed to the ground-hugging assembly by compensation members designed to compensate for the perpendicularity anomalies between the general plane of the ground and the ground hugging direction,
 characterised in that these compensation members include long connecting elements designed to be driven in traction along their respective longitudinal axes, with the long connecting elements being mounted at each of their ends, free to rotate around at least one axis of rotation substantially perpendicular to the ground hugging direction, and with the axes of rotation of each long connecting element being fixed, one axis to the vibration assembly and the other axis to a fixed part of the ground-hugging assembly.

Other characteristics of the invention are in particular that:
 the long connecting elements are tie-rods;
 the long connecting elements consist of tie-rods mounted on swivels;

the compensation members also include isolating members designed to compensate in an asymmetrical manner for the vertical perpendicularity defaults in the general plane of the ground with respect to the ground hugging direction, the said device does not include an upper distribution/synchronisation frame, and the compensation members do not include sliding skids between the vibration assembly and the ground-hugging assembly.

BRIEF DESCRIPTION OF THE DRAWINGS

Other characteristics, objectives and advantages of the invention will appear more clearly on reading the description, illustrated by the following figures.

DETAILED DESCRIPTION OF THE DRAWINGS

Figure 1:
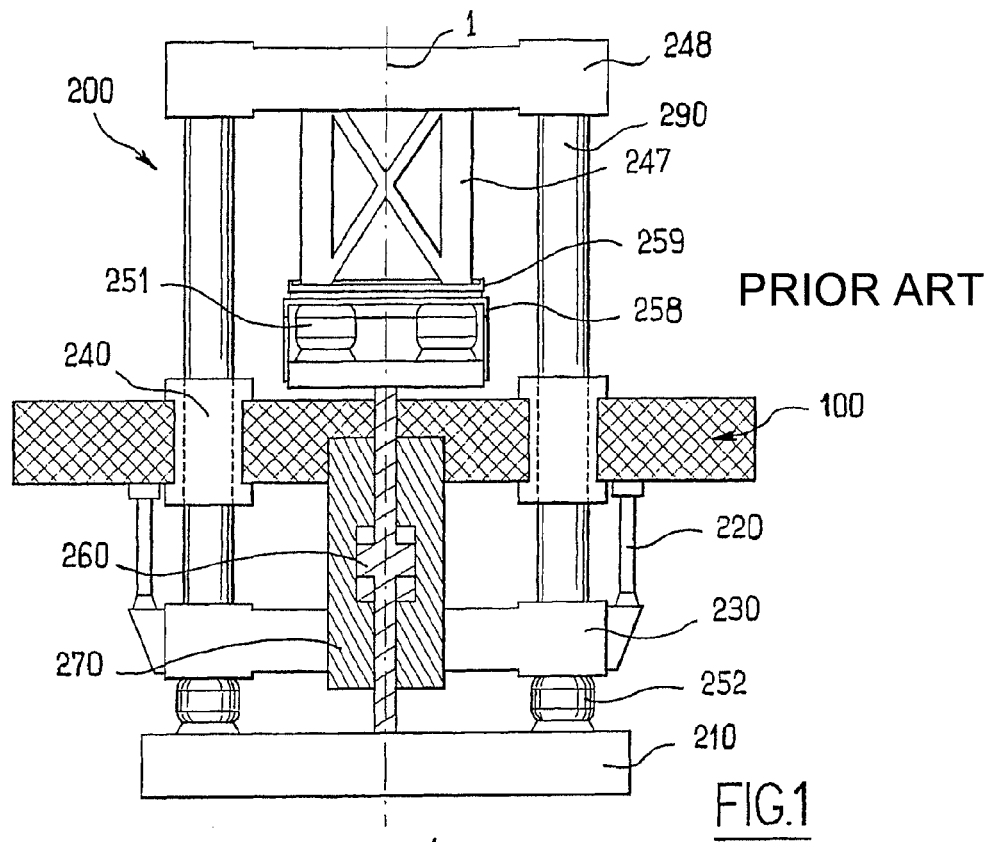
FIG. 1 shows a side view of a device for the emission of seismic vibrations according to previous designs, where the latter is on ground that is parallel to the mobile vehicle.

From a technical viewpoint, a first objective of the invention is to simplify devices of previous design for the emission of seismic vibrations intended to be mounted on a mobile platform, while retaining a device which is also reliable and precise in its application.

A second objective is to render such a device less costly from an economic viewpoint.

A third objective of the invention is to find such a device that offers new and easier technical maintenance.

The device for the transmission of seismic vibrations, intended to be mounted on a mobile platform, according to the invention, includes:

a vibration assembly to transmit the vibrations into the ground, an assembly to make the device hug the ground, compensation members located between the vibration assembly and the ground-hugging assembly, thus forming mechanical linking elements between these two assemblies.

The vibration assembly includes a support plate 210 intended to be placed on the ground, with a reaction mass 270, an upper plate 280, and a piston 260.

The piston 260 is fixed at a first end to the support plate 210 and at the other end to the upper plate 280, and is also inserted into the reaction mass 270, thus allowing a relative movement of the reaction mass 270 in relation to the base plate 210, when the piston 260 is operated in an alternating manner, by a servo-valve for example.

The relative movement of the reaction mass 270, then applying a force to the ground by means of the support plate 210, thus generates seismic vibrations which are then transmitted into the ground.

The ground is not infinitely stiff however, and the support plate 210 therefore additionally undergoes a vertical alternating movement. The total force sent into the ground is then the sum of the forces due to the entities in movement, namely:

(Mass of support plate 210*acceleration of support plate 210)+(mass of reaction mass 270*acceleration of reaction mass 270).

Optionally, the vibration assembly also includes lift columns 225 located between the upper plate 280 and the support plate 210, intended to more evenly distribute the pressure applied by the weight of the mobile platform onto the support plate.

Advantageously, these lift columns 225 are positioned so as to balance the pressure around the piston 260.

For its part, the ground-hugging assembly includes fixing members 240 on the chassis 100 of the mobile platform, raise/lower columns 290 along which the fixing members 240 are designed to slide, at least one beam 230 secured to the lower part of the raise columns 290 and more or less perpendicular to the raise columns 290, and lift jacks 220 provided between the mobile part linked to the chassis 100 and the beam 230 to control the transfer of load due to the weight of the mobile platform 100 on the vibration assembly.

The compensation members of the device 200 of the invention include:

upper compensation members located between the upper part of the vibration assembly and ground-hugging assembly, lower compensation members located between the lower part of the vibration assembly and the ground-hugging assembly.

The upper compensation members include upper isolating members 251 used to compensate for the vertical anomalies of the normal to the ground in relation to the axis 1 of the ground hugging direction.

Figure 4:
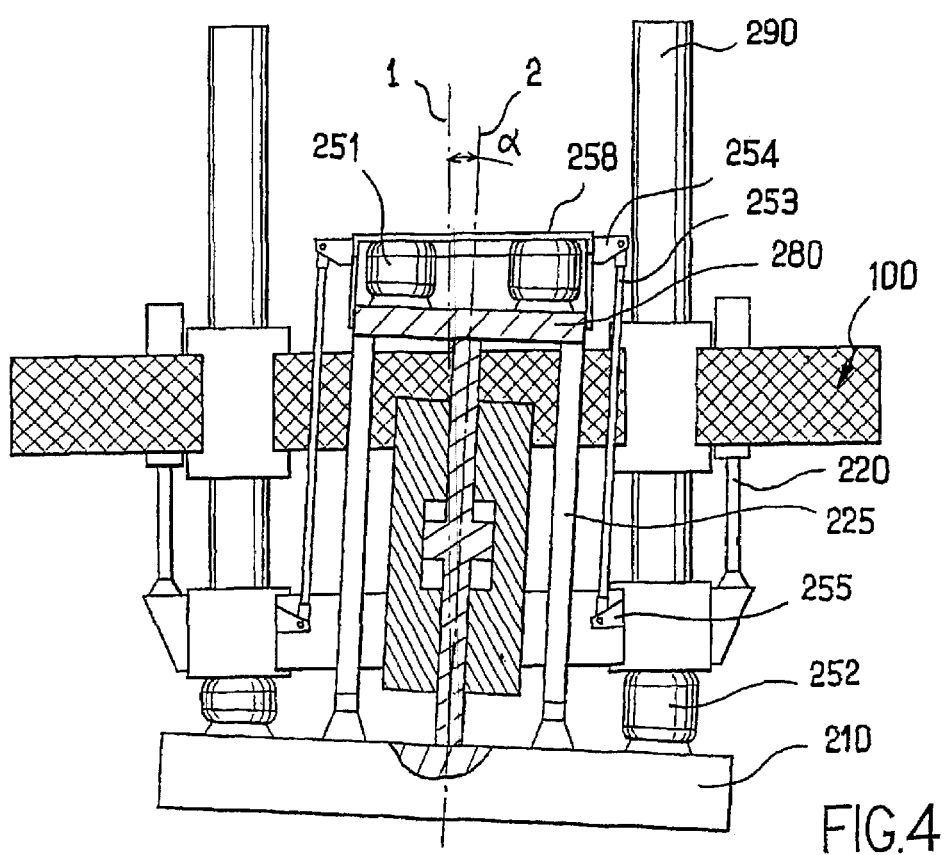
FIG. 4 shows a side view of a device for the emission of seismic vibrations according to the invention, where the latter is on ground which is not parallel to the mobile vehicle.

These isolating members 251 can be air cushions for example, designed to deform pneumatically, in an asymmetrical manner, under the application of mechanical pressure (see FIG. 4.

These upper isolating members 251 are located in a compartment 258.

Figure 6:
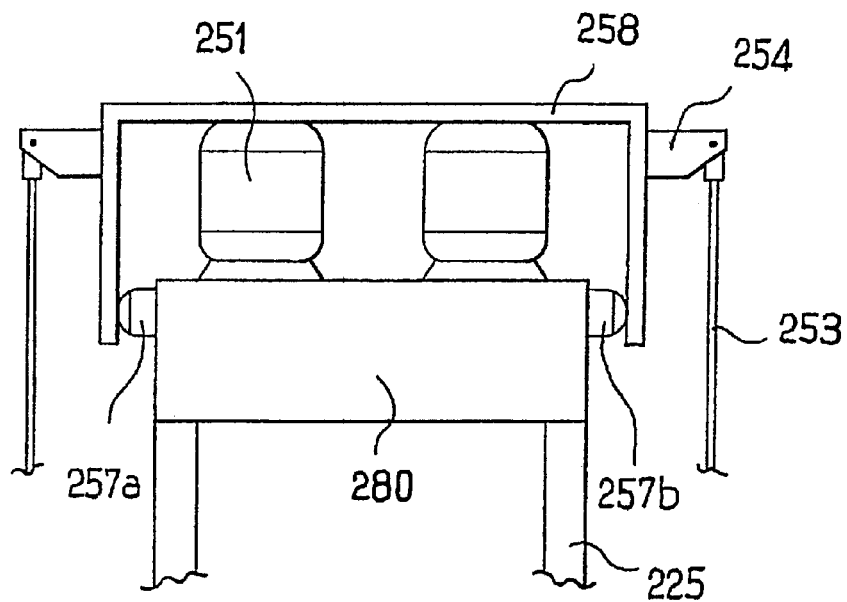

Optionally, referring to FIG. 6, compensation members of the upper horizontal skid type 257a and 257b) made of an elastic material (such as rubber) are placed respectively between the upper plate 280 and lateral extensions of the inner surface of the compartment 258, so as to compensate for horizontal movements of the upper plate 280 in relation to the compartment 258.

The upper isolating members 251 are advantageously placed on the upper plate 280 of the vibration assembly.

An excessively large deviation α of the vibration assembly in relation to the axis 1 of the ground hugging direction, can be limited by means of optional vertical buffers in an elastic material (such as rubber) located between the beam 230 and the support plate 210 (not shown).

The said upper isolating members also include long connecting elements, such as cords, designed to be driven in traction along their respective longitudinal axes, so as to perform a load-holding function along their longitudinal axes.

The long connecting elements are mounted at each of their ends, free to rotate around at least one axis of rotation that is more or less perpendicular to the ground hugging direction 1, with the axes of rotation of each long connecting element being fixed, one axis to the vibration assembly and the other axis to a fixed part of the ground-hugging assembly.

Figure 3:
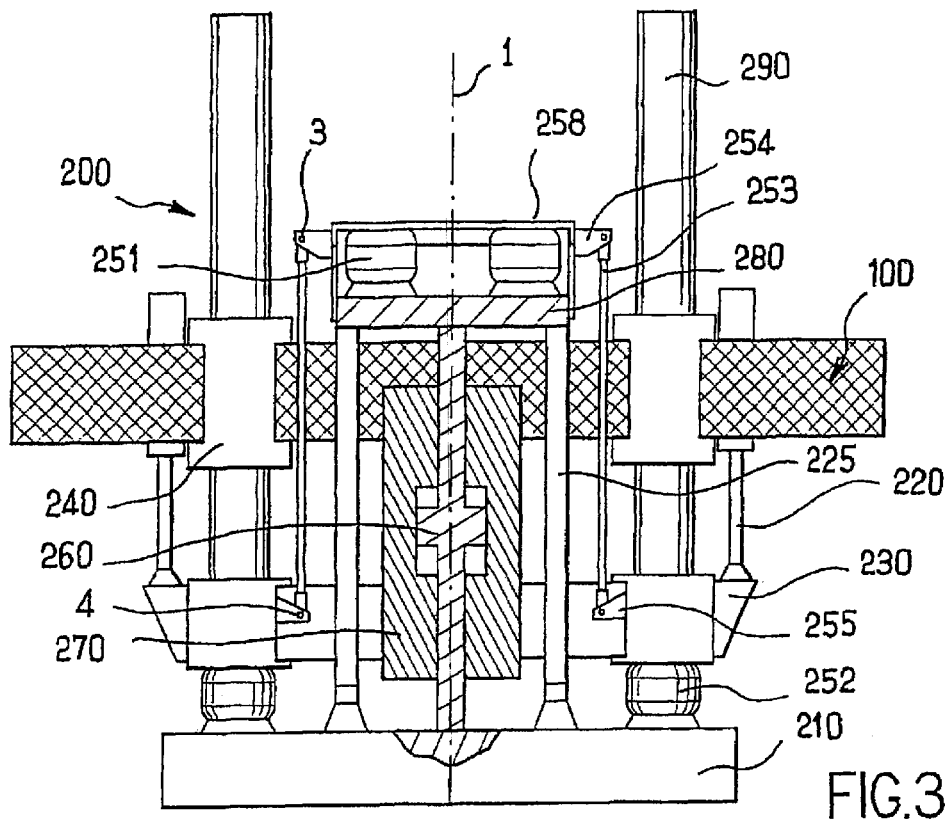
FIG. 3 shows a device for the emission of seismic vibrations according to the invention, where the latter is on ground that is parallel to the mobile vehicle.

Referring to FIGS. 3 and 4, it will be possible, for example, to choose tie-rods 253 as long connecting element, fixed at a first end onto the compartment 258 and at the second end onto a fixed part of the ground-hugging assembly, such as the beam 230. The flexible structure of the tie-rods 253 leaves the first end of the tie-rod 253 free to rotate around an axis 3 that is more or less perpendicular to the axis 1 of the ground hugging direction and the second end of the tie-rod 253 free to rotate around an axis 4 that is more or less perpendicular to the axis 1 of the ground hugging direction.

The characteristics of a tie-rod 253, such as its stiffness, diameter, and diameter/length/applied-force ratios, are determined in particular according to a maximum loading allowed for the mobile platform 100 and a section/pressure ratio of the lift jacks 220.

The tie-rods 253 can be made of steel for example.

It will be possible, for example, to choose, as long connecting elements, tie-rods mounted at their ends on swivels (not shown), with a first swivel of a first end of the tie-rod being fixed onto the compartment 258 for example, and the second swivel of the second end of the tie-rod being fixed onto a fixed part of the ground-hugging assembly for example, such as the beam 230. The swivels are fixed so that the many axes of rotation, defined by each swivel, each include an axis of rotation that is more or less perpendicular to the ground hugging direction 1.

These tie-rods, while performing their holding functions along their respective longitudinal axes, are then left free to rotate around the many axes of rotation defined respectively by the swivels.

The said lower compensation members include lower isolating members 252 located between the distribution/synchronisation beam 230 and the support plate 210. The lower isolating members 252 are used to compensate for part of the vertical ground faults in relation to the axis 1 of the ground-hugging direction.

These isolating members 252 can be air cushions for example, which are pneumatically deformable in an asymmetrical manner.

Figure 5:
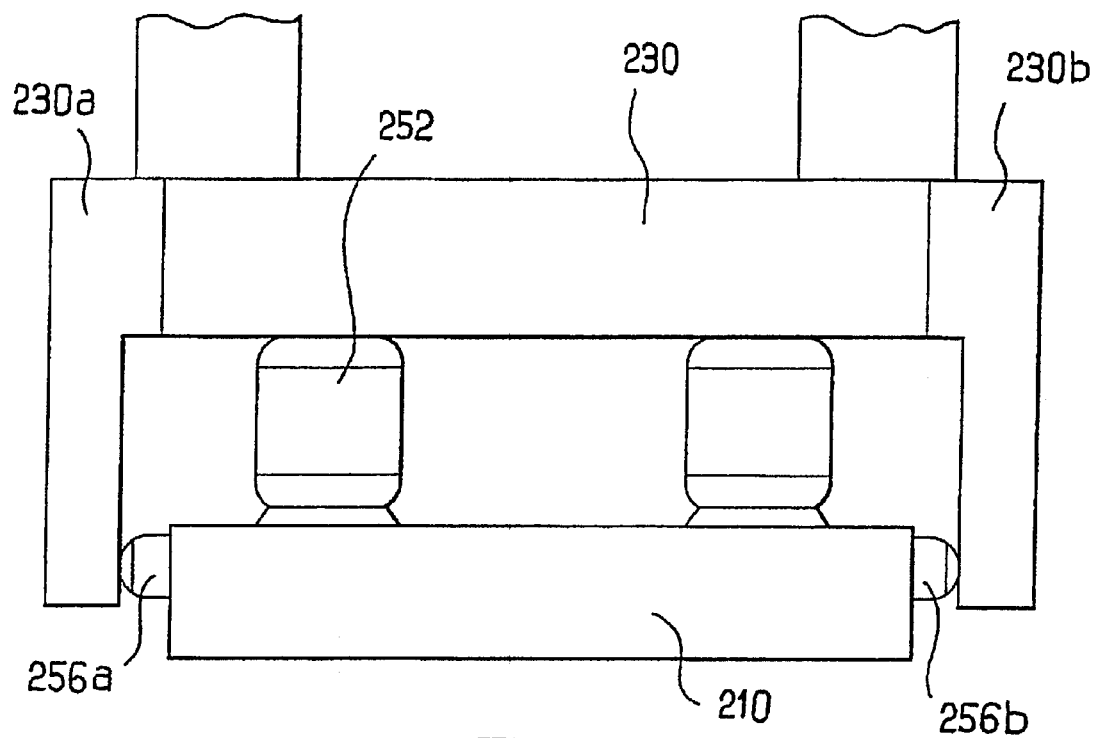
FIGS. 5 and 6 show two implementation variants according to this present invention, including members designed to limit the horizontal movements of the upper plate or the lower beam of the installation.

Optionally, referring to FIG. 5, compensation members of the lower horizontal skid type 256a and 256b), made from an elastic material (such as rubber), are placed respectively between the support plate 210 and the lateral extensions 230a and 230b—provided for this purpose) of the beam 230, so as to compensate for horizontal movements of the beam 230 in relation to the support plate 210.

It can be seen that the beam 230 is used to distribute the load applied by the mobile platform 100 via the lift jacks 220 onto the lower isolating members 252. Thus, the static pre-load applied by the mobile platform 100 onto the support plate 210 (through the lower isolating members 252) is transferred in the most homogeneous manner possible, with the weight of the vehicle being distributed as uniformly as possible over the support plate 210.

In addition to this pressure applied at the level of the lower part of the vibration assembly, there also exist pressures applied by the mobile platform 100 onto the support plate 210 via the upper part of the vibration assembly through the said long connecting elements (such as the tie-rods, 253. In fact, part of the pressure, applied by the mobile platform 100 via the jacks 220 and the beam 230, puts the tie-rods 253 in tension (or, more generally, places stress upon the long connecting elements), then applying a holding pressure onto the vibration assembly against the ground (that is toward the ground), via the fixing members 254 of the tie-rods 253. This pressure toward the ground is transmitted to the support plate 210 through pressure-point groups which are:

a point at the centre of the support plate 210 through the piston 260, points around this centre, through a secondary structure connected to the piston 260 and to the support plate 210, composed of the lift columns 225 and the upper plate 280.

In addition to allowing this transmission of load from the mobile platform 100 to the support plate 210 of the vibration assembly, these tie-rods 253 (or long connecting elements) allow a horizontal movement (in relation to the ground) of the upper part of the vibration assembly, due to free rotation around the pivoting (or rotation) axes 3 and 4 present at their ends.

Thus, referring to FIG. 4, since the ground makes a non-zero angle in relation to the perpendicular of the axis 1 of the ground-hugging direction (the vibration assembly having an axis 2 defined by the piston 260, then has an angle of inclination α in relation to the axis 1 of the ground hugging direction), it can be seen that the compensation members provide:

compensation for the vertical faults of the normal to the ground in relation to the axis 1 of the ground hugging direction, and in particular by virtue of the upper 251 and lower 252 isolating members, and also compensate for the horizontal faults by virtue of the pivoting of the tie-rods 253 (or of the long connecting elements), and possibly the presence of lower horizontal skids 256a-256b and/or upper horizontal skids 257a-257b.

It can be seen here that the results obtained with the device of the invention are fairly similar to those obtained by previous designs.

Figure 2:
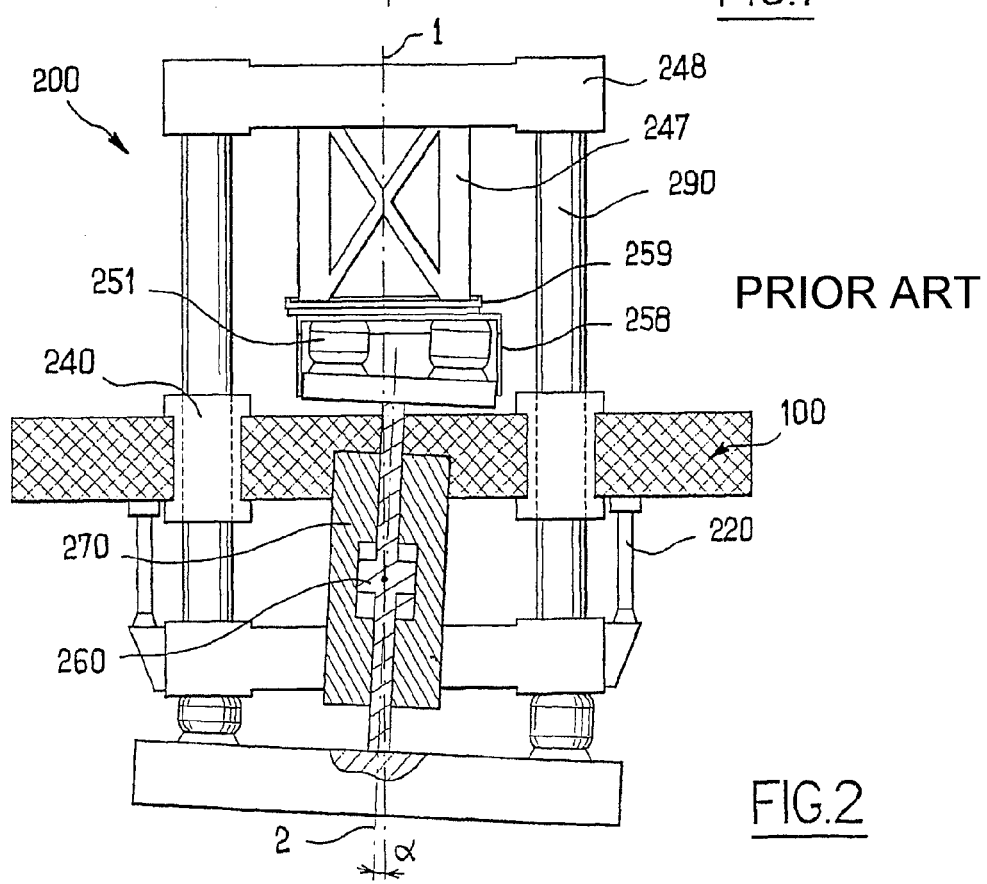
FIG. 2 shows a side view of a device for the emission of seismic vibrations according to previous designs, where the latter is on ground which is not parallel to the mobile vehicle.

However, the device of the invention has a lighter structure, mainly by replacing all the upper part of previous design linked to the sliding skids 259 (see FIGS. 1 and 2 with simple long connecting elements (or tie-rods, 253.

The design according to the invention is therefore lighter and less costly.

In addition, the device 200 according to the invention has an open upper part, which allows easy access to the upper compensation members and to the vibration assembly (and in particular to the piston 260, the reaction mass 270, and the upper compensation members 251 and 253.

The invention claimed is:

1. A device for the emission of seismic vibrations, intended to be mounted on a mobile platform, which includes:
a vibration assembly to send the vibrations into the ground, and
a ground-hugging assembly for the device,
the ground-hugging assembly fixed to the mobile platform and transfers the load from the mobile platform, in a ground hugging direction, onto the vibration assembly fluttered against the ground, with the vibration assembly being fixed to the ground-hugging assembly by compensation members designed to compensate for the perpendicularity anomalies between the general plane of the ground and the ground hugging direction,
wherein the compensation members include long connecting elements having respective longitudinal axes and designed to be driven in traction along said respective longitudinal axes, the long connecting elements each having one end mounted to the vibration assembly and an opposite end mounted to a fixed part of the ground-hugging assembly, each end of each long connecting element being free to rotate around at least one axis of rotation substantially perpendicular to the ground hugging direction.

2. A device according to claim 1, wherein the long connecting elements comprise tie-rods.

3. A device according to claim 1, wherein the long connecting elements comprise tie-rods mounted on swivels.

4. A device according to claim 1, wherein the compensation members also include isolating members designed to compensate, in an asymmetrical manner, for vertical perpendicularity defaults of the general plane of the ground with respect to the ground hugging direction.

* * * * *

UNITED STATES PATENT AND TRADEMARK OFFICE
CERTIFICATE OF CORRECTION

| | | |
|---|---|---|
| PATENT NO. | : 7,499,378 B2 | Page 1 of 1 |
| APPLICATION NO. | : 10/599023 | |
| DATED | : March 3, 2009 | |
| INVENTOR(S) | : Buttin et al. | |

It is certified that error appears in the above-identified patent and that said Letters Patent is hereby corrected as shown below:

Column 1,

Line 56, "angle a" should read --angle α--.

Signed and Sealed this

Thirtieth Day of March, 2010

David J. Kappos
*Director of the United States Patent and Trademark Office*